(12) United States Patent
Edren

(10) Patent No.: US 12,337,641 B1
(45) Date of Patent: Jun. 24, 2025

(54) LAG COMPENSATED ACTIVE SUSPENSION SYSTEM

(71) Applicant: Zoox, Inc., Foster City, CA (US)

(72) Inventor: Johannes Edren, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 147 days.

(21) Appl. No.: 18/240,908

(22) Filed: Aug. 31, 2023

(51) Int. Cl.
*B60G 17/00* (2006.01)
*B60G 17/0165* (2006.01)
*B60G 17/019* (2006.01)

(52) U.S. Cl.
CPC ... *B60G 17/0165* (2013.01); *B60G 17/01908* (2013.01); *B60G 2202/42* (2013.01); *B60G 2300/00* (2013.01); *B60G 2400/104* (2013.01); *B60G 2400/106* (2013.01); *B60G 2400/821* (2013.01); *B60G 2500/30* (2013.01)

(58) Field of Classification Search
CPC .......... B60G 17/0165; B60G 17/01908; B60G 2202/42; B60G 2300/00; B60G 2400/104; B60G 2400/106; B60G 2400/821; B60G 2500/30
USPC ...................................................... 701/37, 38
See application file for complete search history.

(56) References Cited

FOREIGN PATENT DOCUMENTS

TW         201811399 A  *  4/2018  .............  A62C 27/00

* cited by examiner

*Primary Examiner* — Hai H Huynh
(74) *Attorney, Agent, or Firm* — Lee & Hayes, P.C.

(57) ABSTRACT

Systems and techniques for operating an active suspension system are discussed herein. The active suspension system can include a first suspension couple to a first wheel and a second suspension coupled to a second wheel, each suspension can include a first valve, a second valve, and an actuator. While a vehicle is traversing an environment, the vehicle can receive sensor data indicating an uneven surface is within a trajectory of at least the first wheel. A vehicle controller can determine a target position for the actuator of the first suspension, a target current to be generated at the first valve or the second valve and associated with moving the actuator from its current position to the target position, and a target voltage to be apply at the first valve or the second valve to generate the target current to compensate for a change in pitch and/or roll of a vehicle induced by the uneven surface. The vehicle controller can further determine a modified input voltage that causes the target current to be generated at a faster time than the input voltage.

20 Claims, 6 Drawing Sheets

LAG COMPENSATED ACTIVE SUSPENSION SYSTEM

BACKGROUND

An active suspension system proactively adjusts one or more of its characteristic (e.g. a stiffness and/or a height) based on sensor data associated with a vehicle (e.g., data of an environment from image or spatial sensor(s), data of a state of the vehicle from internal vehicle sensor(s), and/or the like). The active suspension system may include a hydraulic actuator that dynamically adjusts the of the suspension based on sensor data. The hydraulic actuator may be operated using two solenoid valves, where the direction of actuation is based on the particular valve that is open through an application of an electrical current to the valve (e.g., opening one valve causes the actuator to move in a first direction while opening the other valve causes the actuator to move in an opposite direction). Generally, the electrical current has an applied input voltage that it corresponds to. When the input voltage is applied to the valve, the current moves at a logarithmic scale. Furthermore, because the valve also generally includes a spring or a similar component which keeps the valve closed when no electricity is applied to the valve, a minimum current level is generally required to be applied to the valve to counteract the force of the spring keeping the valve closed. However, because voltage and current have a logarithmic relationship in a solenoid valve, there is generally a lag between when the electricity is applied to the valve and when the valve starts to open, particularly if the target current is close to or at the minimum current required to counteract the force of the spring.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
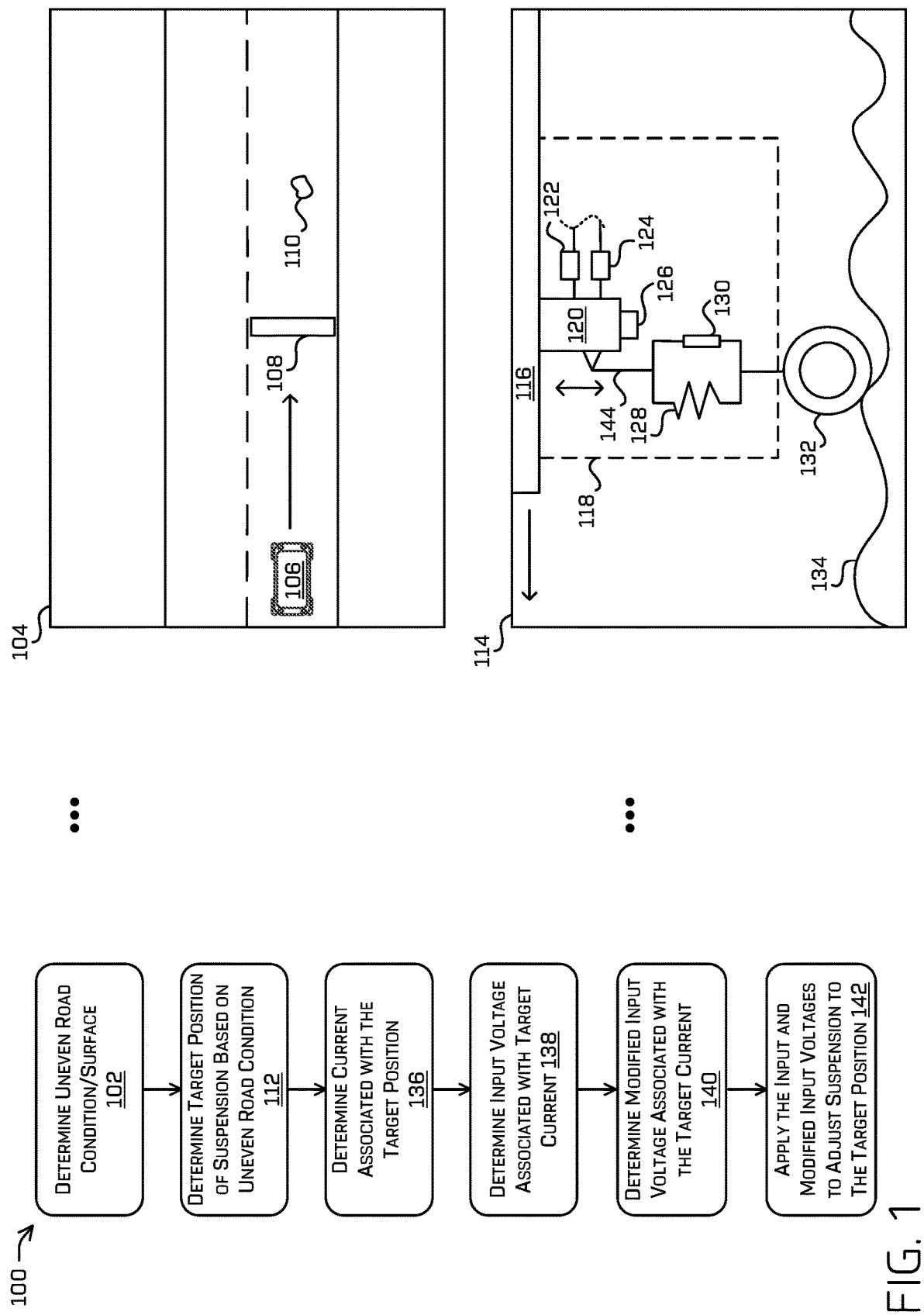
FIG. 1 is a pictorial flow diagram of an example process of operating an active suspension system of a vehicle.

This application relates to systems and techniques for operating an active suspension system of a vehicle. In some examples, the techniques described herein may be used to adjust one or more characteristics (e.g., a stiffness and/or a height) of the suspension system. In some examples, each suspension of the active suspension system may include one or more passive components and one or more active components. In some examples, the height of one or more passive components may be reactive to an elevation of a surface at a wheel of the vehicle and non-adjustable. In some examples, the one or more passive component may include, but are not limited to, a strut and the components of the strut (e.g., a spring and a damper). In some examples, the one or more active components may include an actuator, a first valve associated with an inlet of the actuator, a second valve associated with an outlet of the actuator, and/or the like. In some examples, a position associated with the one or more active components may be adjusted prior to the vehicle arriving at an uneven surface to compensate for an anticipated change in a roll and/or pitch of the vehicle induced by the uneven surface. For example, the uneven surface may be determined with the use of sensor data generated by a senor on the vehicle. In some examples, adjusting the position may include opening the first (e.g., inlet) valve while keeping the second (e.g., outlet) valve closed to allow a fluid to flow into the actuator and thereby moving the actuator in a direction that decreases the height of the suspension. In some examples, opening the first valve may include applying an input voltage to the first valve to generate an electrical current at the first valve to open the first valve.

In some examples, the vehicle may include one or more sensors configured to record sensor data of an environment as the vehicle travels through the environment. In some examples, the sensor data may be indicative of one or more uneven surfaces along the vehicle's trajectory. Examples of the uneven surfaces may include, but are not limited to, bumps, holes, grooves, and/or the like. In some examples, a vehicle controller associated with the vehicle may determine that when the vehicle travels along the one or more uneven surfaces, the one or more uneven surfaces may cause a deviation in a pitch and/or roll of the vehicle, thereby causing ride discomfort to one or more passengers within the vehicle. In such an example, the vehicle controller may determine that the roll and/or pitch of the vehicle deviates in excess of a threshold range of roll and/or pitch. In some examples, such a determination may be based on characteristic(s) of the one or more uneven surfaces (e.g., a height, a steepness, a depth, and/or the like). For example, the vehicle controller may determine, in order to maximize ride comfort, that the threshold range of pitch and/or roll of the vehicle should be zero or substantially zero, and may proactively adjust aspects of the suspension prior to arriving at the uneven surface such that the pitch and/or roll of the vehicle is zero or substantially zero based on the environmental sensor data and/or the internal sensor data. In some examples, the vehicle controller may determine that the vehicle does not deviate from the pitch and/or roll of the vehicle when the vehicle is traversing a flat surface.

In some examples, the vehicle controller may determine, based on the sensor data, a target position of a suspension of the vehicle for mitigating the effects of an uneven surface of the one or more uneven surfaces. In some examples, the target position may be determined based on determining that the uneven surface will cause a deviation in the roll and/or pitch of the vehicle. In some examples, the target position may be determined to be a position associated with the suspension that eliminates or minimizes the deviation in the roll and/or pitch of the vehicle. In some examples, the target position may be a target height of an aspect of the suspension.

In some examples, the vehicle controller may determine a difference between the target position and a current position associated with the actuator of the suspension. In some examples, the actuator may be connected to the strut of the suspension. In some example, the current position associated with the actuator may be associated with a current height of the suspension. In some example, as a position associated with the actuator changes, the height of the suspension also changes. In some examples, the actuator may include an actuator piston, wherein the current position associated with the actuator is a current position of the actuator piston. In some examples, determining the difference includes determining a magnitude of the difference and a difference in elevation between the current position and the target position.

In some examples, the actuator may be a hydraulic or pneumatic actuator connected to a first valve and a second valve. In some examples, the actuator may further include a fluid chamber that includes an actuator piston and is configured to store a volume of fluid and an actuator spring configured to push the actuator piston downwards. In some examples, the first valve may be configured to permit the fluid to pass into the fluid chamber. In some examples, the second valve may be configured to permit a fluid to exit out of the fluid chamber. In some examples, the position of the actuator piston may be based on the volume of fluid inside the fluid chamber. In some examples, as the fluid fills the fluid chamber, the position of the actuator piston may be pushed upwards by the fluid. In some examples, as the fluid exits the fluid chamber, the position of the actuator piston may be pushed downwards by the spring. In some examples, the first valve may be a high pressure valve and the second valve may be a low pressure valve.

In some examples, both the first valve and the second valve may be solenoid valves that are operated either hydraulically or pneumatically. In some examples, each of the first valve and the second valve may include a solenoid, a valve piston, and a valve spring. For example, the first valve may include a first solenoid, a first valve piston, and a first valve spring, and the second valve may include a second solenoid, a second valve piston, and a second valve spring. In some examples, when no electrical current is generated at the first solenoid, the first valve piston is pushed by a first spring force of the first valve spring to keep the first valve at a closed position. In some examples, when the electrical current is generated at the first solenoid, an electromagnetic field is generated as a result at the first solenoid. In some examples, the electromagnetic field counteracts the first spring force and moves the first valve piston to open the first valve. In some examples, the second valve functions the same or similarly to the first valve.

In some examples, the first valve and the second valve may be proportional solenoid valves where the position of the first valve piston and the second valve piston may vary based on a magnitude of the electrical current generated at the first solenoid or the second solenoid. For example, the higher the magnitude of the electrical current generated at the first solenoid, the greater the electromagnetic field, and the more upward the first valve piston is pushed, thereby the more open the first valve is. In some example, the more open the first valve or the second valve is, the greater the volume and/or flow rate of the fluid is permitted to pass through the first valve or the second valve.

In some examples, the vehicle controller can determine a valve between the first valve or the second valve to open based on the difference in elevation of the target position and the current position. For example, when the target position is higher than the current position, the vehicle controller can determine that the first valve is the valve to open to permit the fluid to enter the actuator and apply electric voltage to the first valve to open the first valve. For another example, when the target position is lower than the current position, the vehicle controller can determine that the second valve is the valve to open to permit the fluid to exit the actuator and apply electric voltage to the second valve to open the second valve.

In some examples, the vehicle controller can determine a target current associated with a difference between the target position and the current position of the actuator piston. In some examples, the target current may be an electrical current that, when generated at the first solenoid or the second solenoid, opens the first valve or the second valve to a position such that the fluid moves in or out of the actuator to move the actuator piston to the target position. In some examples, the magnitude of the target current may be directly proportional to the magnitude of the difference between the target position and the current position of the actuator piston.

In some examples, the vehicle controller can determine an input voltage associated with the target current. In some examples, when the input voltage is applied to the first solenoid or the second solenoid, an electrical current may be generated, wherein a magnitude of the electrical current reaches a steady state magnitude corresponding to a magnitude of the target current after a logarithmic time. In some examples, the logarithmic time may cause a delay between when the input voltage is applied and when the magnitude of the electrical current reaches a minimum current sufficient to move the first valve piston or the second valve piston. In some examples, the delay may result in the actuator piston being moved after the vehicle has traversed or begun to traverse the uneven surface.

In some examples, the vehicle controller can determine a modified input voltage configured to eliminate or mitigate the delay. In some examples, the modified input voltage may be determined to generate the electrical current to the target current within a time period less than the logarithmic time associated with the input voltage. In some examples, the modified input voltage may be at a magnitude such that the magnitude of the electrical current reaches the target current instantaneously or near instantaneously. In some examples, the modified input voltage may be based on an inductance and resistance of the first solenoid and/or the second solenoid.

In some examples, sensor(s) may continuously provide real time sensor data, and the vehicle controller may continuously adjust the active suspension at each wheel in real time based on the real time sensor data.

The active suspension techniques described herein may improve a function of the active suspension system by providing a robust method of proactively adjusting one or more parameters of the active suspension system, such as ride height, or the like, prior to the vehicle traversing an uneven surface. In the context of the active suspension, the adjustments may improve the effectiveness of the active suspension system compensating for the changes in the roll and/or pitch induced by uneven surfaces as the vehicle traverses the environment, and thereby, may improve ride comfort. In the context of the modified input voltage, the modified input voltage may improve power saving by allowing for the voltage to be applied in shorter bursts and may improve the responsiveness of the active suspension system. These and other improvements to the functioning of the vehicle are discussed herein.

The methods, apparatuses, and systems described herein may be implemented in a number of ways. Example implementations are provided below with reference to the following figures. While this disclosure uses an autonomous vehicle in examples, techniques described herein are not limited to application in autonomous vehicles. For example, any system that uses an active suspension system to navigate an environment may benefit from the techniques described. In another example, techniques described herein may be used on aircrafts, e.g., to the suspension system of its landing gears to minimize the impact of landing. Moreover, non-autonomous vehicles could also benefit from techniques described herein.

FIG. 1 a pictorial flow diagram of an example process 100 of operating an active suspension system of a vehicle. In some examples, the vehicle may correspond to a vehicle 106 illustrated in an example 104. In some examples, the vehicle may have a suspension system corresponding to a suspension system 118 illustrated in an example 114.

An operation 102 may include determining, from sensor data, an uneven road condition and/or surface. In some examples, determining the uneven surface may include determining that the uneven surface is along a trajectory (also referred to as a travel path) of the vehicle 106. In some examples, the sensor data may indicate a characteristic associated with the uneven surfaces (e.g., a position, a height or depth, a steepness, and/or the like). In some examples, such sensor data may be captured by one or more environmental sensors associated with the vehicle 106 and configured to capture data associated with an environment that the vehicle 106 traverses through. Examples of the one or more environmental sensors may include, but are not limited to, image sensors, radar sensors, lidar sensors, and/or the like. In some examples, a vehicle controller or other computing system associated with the vehicle 106 may determine, based on the sensor data, that the one or more uneven surfaces may affect a roll and/or pitch of the vehicle 106 based on an interaction between one or more wheels of the vehicle 106 and the one or more uneven surfaces.

The example 104 illustrates a scenario where a first uneven surface 108 and a second uneven surface 110 are within a trajectory or path of travel of the vehicle 106 (as illustrated by the arrow). In the example 104, the first uneven surface 108 is a bump (e.g., a speed bump or the like) and the second uneven surface 110 is a hole (e.g., a pothole or the like). In the example 104, as the vehicle 106 travels along its trajectory, its vehicle controller may receive sensor data about the first uneven surface 108 and the second uneven surface 110. The vehicle controller can determine, based on the sensor data, adjustment(s) to make at the suspension at each relevant wheel such that the pitch and/or roll of the vehicle 106 is zero or substantially zero as the vehicle 106 interfaces with the first uneven surface 108 and the second uneven surface 110. In some examples, a relevant wheel may be a wheel of the vehicle 106 that directly interfaces with first uneven surface 108 and/or the second uneven surface 110. For example, because the first uneven surface 108 is positioned across the entire driving lane, the vehicle controller can determine that all of its wheels are relevant wheels, and determine adjustment(s) to the suspension at each wheel of the vehicle 106 such that the pitch and/or roll of the vehicle 106 is zero or substantially zero or remains a same pitch and/or roll as when the vehicle 106 traverses along a flat surface when each wheel interacts with the first uneven surface 108. As another example, because the second uneven surface 110 is positioned such that it is in the path of the right wheels of the vehicle 106, the vehicle controller can determine that just the right side wheels of the vehicle 106 are the relevant wheels and determine adjustment(s) to the suspensions at just the right side wheels such that the pitch and/or roll of the vehicle 106 is zero or substantially zero when each of the wheels at the right side of the vehicle 106 interacts with the second uneven surface 110.

In some examples the vehicle controller may determine adjustment(s) to the suspension at each wheel. In the example of the first uneven surface 108, the vehicle controller may determine, based on the direction of travel of the vehicle 106, the front wheels and the rear wheels of the vehicle 106. The vehicle controller can further determine a first track associated with the wheels proximate a first longitudinal side of the vehicle 106 (e.g., the left side of the vehicle 106) and a second track associated with the wheels proximate a second longitudinal side of the vehicle 106 opposite the first longitudinal side (e.g., the right side of the vehicle 106). The vehicle controller can determine, in addition to the adjustments to the suspensions of the front wheels of the vehicle 106 and the suspensions of the rear wheels of the vehicle 106, based at least on the direction of travel, the first track, the second track, an acceleration of the vehicle 106, a heading of the vehicle 106, a velocity of the vehicle 106, and/or the like, a first timing associated with when the front wheels of the vehicle 106 reaches the first uneven surface 108 and a second timing associated with when the back wheels of the vehicle 106 reaches the first uneven surface 108 (which may be speed dependent). The vehicle controller may use the first timing and the second timing to adjust the suspension at each wheel as the vehicle 106 approaches the first uneven surface 108.

In some examples, the vehicle controller may predict two tracks (one for each pair of wheels) in a direction that a vehicle is travelling. In some examples, the vehicle may have four-wheel steering and may be able to independently control the steering angle at each of the wheels. As such, the vehicle may be able to perform maneuvers including "crab-walking" wherein the wheels are pointed in a direction lateral to a longer longitudinal dimension of a vehicle body or frame. In some examples, each wheel may be independently steered such that a wheel does not follow a path already traversed by another wheel. The vehicle controller may dynamically modify the tracks used for the disclosed techniques depending on a driving mode of a vehicle transitioning between two to four or a direction of tracks in relation to a vehicle as the vehicle changes driving modes corresponding to steering of wheels. In some examples, the vehicle controller may make the adjustment to the suspension(s) at the relevant wheel(s) at a threshold time or at a threshold distance prior to arriving at the first uneven surface 108 and/or the second uneven surface 110 and/or when the vehicle wheel contacts the imperfection(s) in the road surface so that the suspension system may react in real time as the vehicle traverses the imperfections. The disclosed techniques can enable these modifications to the suspension system faster than traditional feedback systems which must wait for an output of the system and adjust the system accordingly. For example, the vehicle controller can determine a time period associated with the threshold distance and make the adjustment within the time period. In some examples, the vehicle controller may determine the adjustment(s) to each suspension at each relevant wheel based on a characteristic of the uneven surfaces 108 and 110. For example, the vehicle controller can determine the adjustments(s) and/or an amount of adjustment based on a height, depth, steepness, and/or the like of the uneven surfaces 108 and 110. In such an example, the vehicle controller can determine based on the height, depth and/or steepness, whether the pitch and/or roll of the vehicle 106 exceeds a threshold pitch and/or roll (e.g., when the pitch and/or roll is non-zero, deviates from the pitch and/or roll of the vehicle when on the flat surface, and/or the like). Alternatively, the vehicle controller can determine the adjustment(s) and/or an amount of adjustment based on whether the characteristic of the uneven surfaces 108 and 110 exceeds a threshold characteristic (e.g., the height exceeds a threshold height, the depth exceeds a threshold depth, the steepness exceeds a threshold steepness, and/or the like).

In some examples, in addition to determining the adjustment(s) based on the characteristic(s) associated with the uneven surfaces 108 and 110, the vehicle controller may determine the adjustment(s) based on characteristic(s) associated with each suspension at each relevant wheel. In some examples, the characteristic(s) may be associated with just the passive component(s) of each suspension (e.g., a maximum or current compression and/or a maximum or current height of a strut of the suspension) such that the adjustment(s) may be made to the active component(s) of each suspension based on the characteristic(s) associated with the passive component(s).

In some examples, the vehicle controller may determine a compression and/or a height of the strut associated with the vehicle 106 being on a flat surface. In some examples, the vehicle controller may lock the compression and/or the height of the strut at the level of when the vehicle 106 is on the flat surface, and keeps the strut at the locked level when making the adjustment(s).

As a non-limiting example of adjustment(s) that may be made to a suspension based on uneven surfaces, the example 114 illustrates the suspension system 118. The suspension system 118 may be associated with a wheel of the vehicle 106. While the example 114 illustrates one suspension system at one wheel, the vehicle controller may make the same or similar adjustment(s) at any or all of suspensions at the other wheel(s) of the vehicle 106 as necessary. The suspension system 118 includes active components (e.g., an actuator 120, a first valve 122, and a second valve 124) and passive components (e.g., a strut spring 128 and a strut damper 130). The suspension system 118 is configured to couple a frame, chassis, or body 116 of the vehicle 106 to a wheel 132 of the vehicle 106 traversing a surface 134. In some examples, the strut spring 128 and the strut damper 130 may be components within a strut of the suspension system 118. In some examples, the actuator 120, the first valve 122, the second valve 124, the strut spring 128 and the strut damper 130 may be associated with one or more fluid hydraulic systems or one or more pneumatic systems and controlled based on a volume and/or a rate of fluid that enters, exits, and stays within the strut and/or the actuator 120. The suspension system 118 also includes a position sensor 126 that is configured to measure a position associated with the actuator 120. In some examples, the actuator 120 is a hydraulic actuator and the position sensor 126 is configured to measure a position of an actuator piston within the actuator 120. The actuator piston may be movable to different positions along a longitudinal axis of the actuator (also referred to as a length of the actuator 120). The actuator piston may be connected to a stem 144 that is connected to the strut spring 128 and the strut damper 130. The example 114 illustrates that the stem 144 may be moved up and down along the length of the actuator 120 as the actuator piston moves up and down along the length of the actuator 120 (as illustrated by the double-headed arrow). For example, as the actuator piston moves in a direction toward the body 116, the stem 144 also moves in that same direction. In some examples, a height of the suspension system 118 may correspond to the position of the actuator piston (illustrated as a triangle on the left side of the actuator 120). For example, when the position of the actuator piston is relatively closer to the body 116, the height of the suspension system 118 is relatively shorter, whereas when the position of the actuator piston is relatively farther from the body 116, the height of the suspension system is relatively higher or taller.

In some examples, the position of the actuator piston may be adjusted using the first valve 122 and the second valve 124. In some examples, the first valve 122 may be a high pressure valve and/or may be configured to permit fluid to enter the actuator 120. Also in examples, the second valve 124 may be a low pressure valve and/or may be configured to permit the fluid to exit the actuator 120. In some examples, the first valve 122 and the second valve 124 may be solenoid valves. In such an example, each of the first valve 122 and the second valve 124 may include a solenoid, a valve spring, and a valve piston. When no electrical current is generated at the solenoid, the first valve 122 and/or the second valve 124 is maintained at a closed position by the valve spring, thereby preventing the fluid from passing through the valve to or from the actuator 120. When an electric current is generated at the solenoid, an electromagnetic field is also generated at the solenoid that counteracts a spring force of the valve spring and lifts the valve piston to place the first valve 122 and/or the second valve 124 in an open position, thereby permitting the fluid to pass through the first valve 122 and/or the second valve 124. In some examples, a minimum amount of electric current may need to be generated at the solenoid before a sufficient electromagnetic field can be generated to counteract the spring force of the valve spring and open the first valve 122 and/or the second valve 124.

In some examples, the valves 122 and/or 124 may be proportional solenoid valves. In some examples, as proportional solenoid valves, the valves 122 and/or 124 have variable opening positions where, depending upon the amount of current generated at the solenoid, the valve piston may be moved to different positions along a longitudinal axis of the first valve 122 and/or the second valve 124. In some examples, the valve piston may be moved between a fully closed position where the fluid is prevented from passing through the first valve 122 and/or the second valve 124 to a full open position where a maximum volume and/or flow of the fluid is permitted to pass through the first valve 122 and/or the second valve 124 and various positions between the fully closed position and the fully open position where some volume and/or flow rate of the fluid less than the maximum is permitted to pass through the first valve 122 and/or the second valve 124. In such an example, the position of the valve piston is directly correlated with the amount of current generated at the solenoid (e.g., the more current generated, the more open the first valve 122 and/or the second valve 124 is). In some examples, the applied voltage and/or current may be associated with a change in the position of the stem 144 and a threshold time. For example, when the change in the position of the stem 144 is determined to be large (e.g., when a change in a corresponding position of the piston of the actuator 120 is large), the applied voltage and/or current to the first valve 122 may be large in order to permit a greater volume and/or flow rate of the fluid to pass into the actuator 120 to facilitate the large change in position.

At operation 112, the vehicle controller may determine a target position associated with the one or more suspensions, e.g., the suspension system 118, based on the uneven road condition and/or surface. In some examples, the target position associated with the one or more suspensions may be associated with the characteristic(s) of the uneven surfaces 108 and/or 110. In some examples, the target position may be a target height of the suspension system 118. In such an example, the target position is associated with a target height of the actuator 120 while the vehicle controller maintains the compression and/or height of the strut of the suspension system 118 at a level of when the vehicle 106 is on a flat surface. In some examples, the target position may be a target position of the actuator piston. In some examples, vehicle controller may determine the target position based on determining that the spring 128 and the damper 130 are unable to maintain the vehicle 106 within a threshold range of pitch and/or roll such as the pitch and/or roll of the vehicle 106 while the vehicle 106 travels along a flat surface. In some examples, the operation 112 may further determine a difference between the target position and a current position of the actuator piston (also referred to as an error). In some examples, the current position of the actuator piston may be measured by the position sensor 126.

Additionally or alternatively, in some example, the vehicle controller may determine the target position based on an attribute associated with the trajectory of the vehicle 106. In some examples, the attribute may be map data associated with an environment that the vehicle 106 is traversing through. In some examples, the map data may indicate the uneven road condition. In some examples, the attribute may be associated with a control of the vehicle 106 such as an acceleration, a braking, a turning, and/or other attributes associated with the control of the vehicle 106 that may cause a change in the roll and/or pitch of the vehicle 106. In some examples, the control of the vehicle 106 may be related to controlling or moving the vehicle 106 that may lead to a change in the pitch and/or roll of the vehicle 106.

Operation 136 may include determining a target current associated with the target position. In some examples, the target current may be a current that, when generated at the solenoid of the first valve 122 or the second valve 124, opens the first valve 122 or the second valve 124 to a position such that the fluid moves in or out of the actuator 120 and moves the actuator piston to the target position. In some examples, a magnitude of the target current may be determined based on the difference between the target position and the current position of the actuator piston. For example, the greater the difference between the target position and the current position of the actuator piston, the greater the magnitude of the target current.

In some examples, the operation 136 may also determine which valve to open (e.g., the first valve 122 or the second valve 124) based on the sensor data. In some examples, the valve to open may be determined based on a direction of the target position from the current position of the actuator piston. For example, when the target position is below the current position of the actuator piston (e.g., when the target position is away from the body 116 and toward the wheel 132), the vehicle controller can determine to apply a current to the second valve 124 to cause the second valve 124 to open. For another example, when the target position is above the current position of the actuator piston (e.g., when the target position is toward the body 116 and away from the wheel 132), the vehicle controller can determine to apply a current to the first valve 122 to cause the first valve 122 to open.

Figure 3:
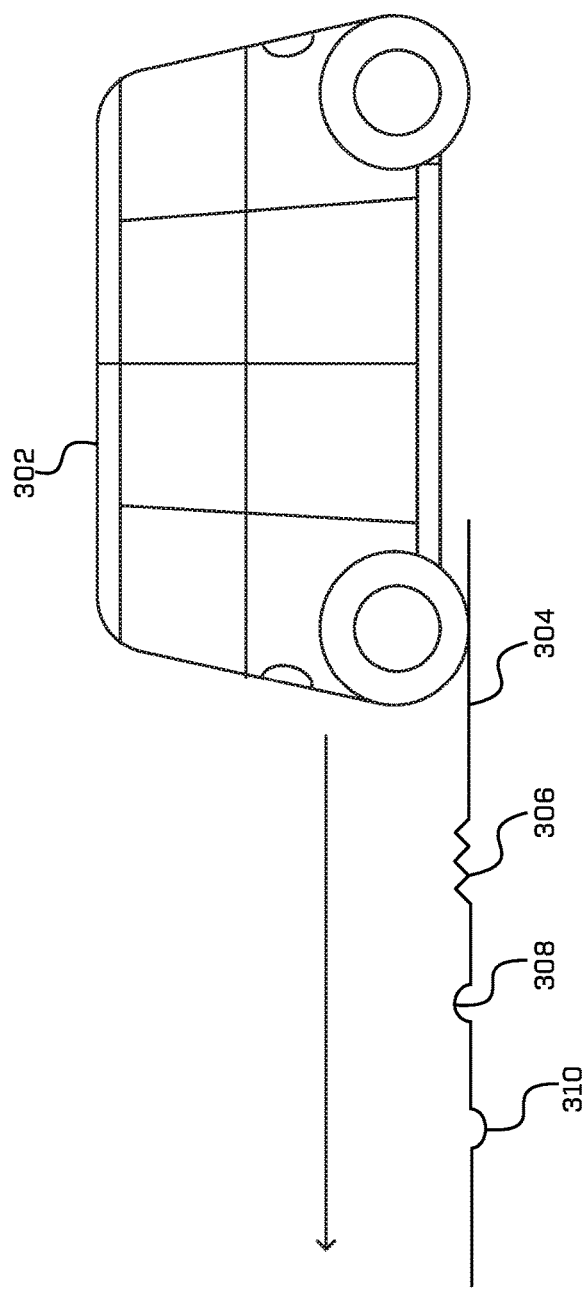
FIG. 3 is an illustration of an alternative scenario wherein the vehicle encounters uneven surfaces along its trajectory.

Operation 138 may include determining an input voltage associated with the target current. In some examples, the input voltage may be a voltage that, when applied the solenoid of the first valve 122 and/or the second valve 124, generates an electrical current at the solenoid of the first valve 122 and/or the second valve 124 to a steady state magnitude at the magnitude of the target current. In some examples, when the input voltage is applied to the solenoid of the first valve 122 and/or the second valve 124, the magnitude of electrical current changes at a logarithmic time until the magnitude reaches the steady state magnitude. In some examples, the logarithmic time may result a delay between when the input voltage is applied and when the magnitude of the electrical current that is generated to reach a minimum current sufficient to move the valve piston of the first valve 122 and/or the second valve 124. In some examples, particularly when the difference between the target position and the current position of the actuator piston is small and/or that there is a plurality of continuous peaks and dips in the trajectory of vehicle 106 (e.g., as illustrated in FIG. 3), this delay in opening the first valve 122 and/or the second valve 124 may result in the suspension system 118 being adjusted for an uneven surface that the vehicle has already passed. In some examples, this delay may also result in applying the input voltage for longer time to compensate for the logarithmic time and at a longer distance prior to the vehicle 106 arriving at the uneven surface.

Operation 140 includes determining a modified input voltage associated with the target current. In some examples, the modified input voltage may be configured to eliminate or substantially mitigate the delay between when the input voltage is applied to the solenoid and when the magnitude of the electrical current is generated at the solenoid of the first valve 122 and/or the second valve 124 reaches the minimum current sufficient to move the valve piston of the first valve 122 and/or the second valve 124. In some examples, the modified input voltage is configured such that when applied, causes the magnitude of the electrical current generated at the solenoid to reach the target current at a time that is immediate or substantially immediate to when the modified input voltage is applied. In some examples, the operation 140 may include determining the modified input voltage such that the magnitude of the current generated reaches the target current within a threshold period of time. In some examples, the threshold period of time may be determined to be less than the logarithmic period of time from the operation 138. In some examples, the threshold period of time may be determined to be less than a period of time associated with the magnitude of the electrical current generated by applying the input voltage at the solenoid reaching the minimum current to move the valve piston. In some examples, the modified input voltage may be determined based on a threshold distance between uneven surfaces being less than a distance necessary to compensate for the logarithmic time associated with the input voltage.

In some examples, a current over time with respect to the input voltage and/or the modified input voltage may be continuously measured and/or monitored in real time. In some examples, as the first valve 122 and/or the second valve 124 is continuously used during vehicle operation, one or more components of the valves may deteriorate. In some examples, the deteriorating component may be the solenoid of the first valve 122 and/or the second valve 124, and as such, the inductance and/or resistance of the solenoid may change such that when the input voltage is applied to the solenoid, the current generated at the solenoid is no longer associated with the target current and/or the target position. In some examples, the vehicle controller can determine, as it continuously monitor the current being generated at the solenoid with respect to the input voltage and based on a magnitude and/or change in the current over time, that the inductance and/or resistance has changed. For example, a rate of change of the current as it decays or changes may be used to infer the inductance and/or resistance (e.g., e.g., using RL equations). Additionally or alternatively, in some examples, the vehicle controller may continuously monitor the inductance and/or resistance of the solenoid in real time. In some examples, the vehicle controller can determine, based on the change in the current over time and/or the inductance and/or resistance, updated input voltage that is associated with the input voltage such that applying the updated input voltage to the solenoid causes the target current to be generated at the solenoid. In some examples, the current over time associated with the valves may additionally and/or alternatively be changed based on temperature (e.g., ambient temperature, temperature of the valve, temperature of the suspension system, and/or the like), and the vehicle controller may determine the updated input voltage based on the temperature.

For example, the vehicle controller may measure, at a first time, a first inductance and/or resistance, and determine the input voltage and the modified input voltage based on the first inductance and/or resistance. The vehicle controller may measure, at a second time after the first time, a second inductance and/or resistance, and determine a second input voltage and a second modified input voltage such that the current generated at the solenoid is the target current.

Operation 142 includes applying the input voltage and the modified input voltage to the solenoid of the first valve 122 and/or the second valve 124 to adjust the position of the suspension system 118 to the target position. In some examples, the operation 142 may include first applying the modified input voltage for the threshold period of time or until the magnitude of the electrical current generated reaches the target current. In some examples, the operation 142 may further include applying the input voltage once the electrical current generated reaches the target current or once the threshold period of time has passed. In some examples, the operation 142 may further include stopping the input voltage or the modified input voltage once the target position is reached but before a new target position is determined to close the first valve 122 or the second valve 124. In some examples, the operation 142 may only be performed at the first valve 122 or the second valve 124 in order to open one of the first valve 122 or the second valve 124 to adjust the position of the actuator piston. The valve which the operation 142 is not performed at may be maintained in a closed position.

Figure 2:
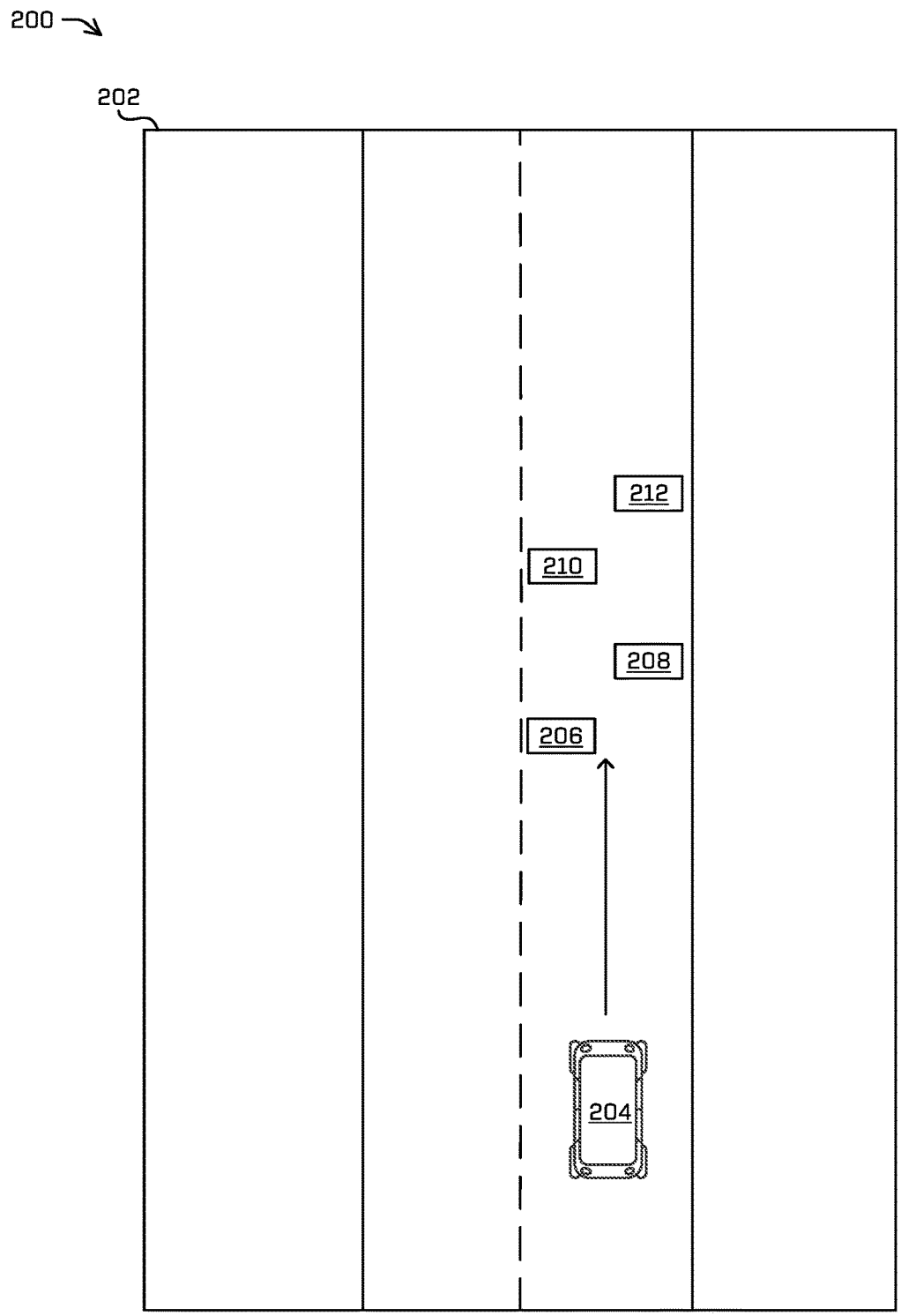
FIG. 2 is an illustration of a scenario where a vehicle encounters uneven surfaces along its trajectory.

FIG. 2 is an illustration 200 of a scenario 202 where a vehicle encounters uneven surfaces along its trajectory. The scenario 202 includes a vehicle 204, a first uneven surface 206, a second uneven surface 208, a third uneven surface 210, and a fourth uneven surface 212. The vehicle 204 may correspond to the vehicle 106 illustrated and described in association with FIG. 1.

As the vehicle 204 traverses along its trajectory (as illustrated by an arrow), sensor(s) associated with the vehicle 204 can detect, as part of sensor data, the first uneven surface 206, the second uneven surface 208, the third uneven surface 210, and the fourth uneven surface 212. The sensor data can indicate a position of each of the uneven surfaces and characteristic(s) of each of the uneven surfaces (e.g., a height or depth, a size, a steepness, and/or the like). A vehicle controller associated with the vehicle 204 can determine, from the sensor data and based at least on the positions of the uneven surfaces and the characteristic(s) of the uneven surfaces, the wheel(s) of the vehicle 204 (also referred to as relevant wheel(s)) that may be in the path of at least one of the uneven surfaces (also referred to as relevant uneven surface(s)). For example, the vehicle controller can determine that the first uneven surface 206 and the third uneven surface 210 may be in the path of the wheels proximate the left side of the vehicle 204 and that the second uneven surface 208 and the fourth uneven surface 212 may be in the path of the wheels proximate the right side of the vehicle 204. The vehicle controller can further determine, based at least in part on the characteristic(s) of the relevant uneven surface(s), a target position of suspension system(s) associated with the relevant wheel(s), a target current associated with the target position, an input voltage associated with the target current, and a modified input voltage associated with the target current. Details with respect to the vehicle controller making these determinations are described in association with FIG. 1 as well as throughout this disclosure. In some examples, the vehicle controller can, in addition, make these determinations based on characteristic(s) associated with the suspension system(s) (e.g., the resistance and/or inductance of solenoid coil(s) of the valve(s) of the suspension system(s)). In some examples, the vehicle controller can further determine a timing for applying input voltage at the suspension system of each relevant wheel based on the sensor data and/or the characteristic(s).

FIG. 3 is an illustration of an alternative scenario 300 wherein the vehicle encounters uneven surfaces along its trajectory (as illustrated by the arrow). The scenario 300 includes a vehicle 302, a road 304, a first uneven surface 306, a second uneven surface 308, and a third uneven surface 310. The vehicle 302 may correspond with the vehicle 106 as illustrated in association with FIG. 1.

As the vehicle 302 traverses along its trajectory on the road 304, sensor(s) associated with the vehicle 302 can detect, as part of sensor data, the first uneven surface 306, the second uneven surface 308, and the third uneven surface 310. The sensor data can indicate a position of each of the uneven surfaces and characteristic(s) of each of the uneven surfaces (e.g., a height or depth, a size, a steepness, and/or the like). A vehicle controller associated with the vehicle 204 can determine, from the sensor data and based at least on the positions of the uneven surfaces and the characteristic(s) of the uneven surfaces, the wheel(s) of the vehicle 204 (also referred to as relevant wheel(s)) that may be in the path of at least one of the uneven surfaces (also referred to as relevant uneven surface(s)).

For example, the sensor data can indicate that the first uneven surface 306 is a plurality of successive peaks and dips which results in continuous elevation changes and subject the vehicle 302 to continuous changes in its pitch and/or roll. In such an example, a vehicle controller associated with the vehicle 302 can continuously adjust the position of the suspension systems at each wheel in real time to minimize the change in pitch and/or roll of the vehicle 302. In some examples, the continuous adjustments can include determining a plurality of target positions corresponding to each of the peaks and dips, a plurality of target currents corresponding to the target positions, determining a plurality of input voltages correspond to the target currents, and a plurality of modified input voltages corresponding to the target currents. When the vehicle controller determines that when the vehicle 302 is ascending the peaks that a modified input voltage be applied to a second valve such that the second valve opens to permits fluid to pass out of an actuator of a suspension system associated with a wheel of the vehicle 302 such that the vehicle 302 maintains a same pitch and/or a roll as when the vehicle 302 was traveling on a flat surface. When the vehicle controller determines that when the vehicle 302 is descending the dips that a modified input voltage be applied to a first valve such that the first valve opens to permit fluid to travel into the actuator to maintain the same pitch and/or roll of the vehicle 302 as when the vehicle 302 was traveling on the flat surface. The first valve and the second valve may correspond to the first valve 122 and the second valve 124 described in association with FIG. 1. In this example, when the first valve is open, the second valve is closed (e.g., no input voltage or modified input voltage is applied to the second valve) and when the second valve is open, the first valve is closed.

As another example, the vehicle controller can determine to open the second valve while keeping the first valve closed when ascending the second uneven surface 308 and opening the first valve while closing the second valve when descending the second uneven surface 308. Similarly, the vehicle controller can determine to open the first valve while keeping the second valve closed when descending the third uneven surface 310 and opening the second valve while ascending the third uneven surface 310.

Figure 4:
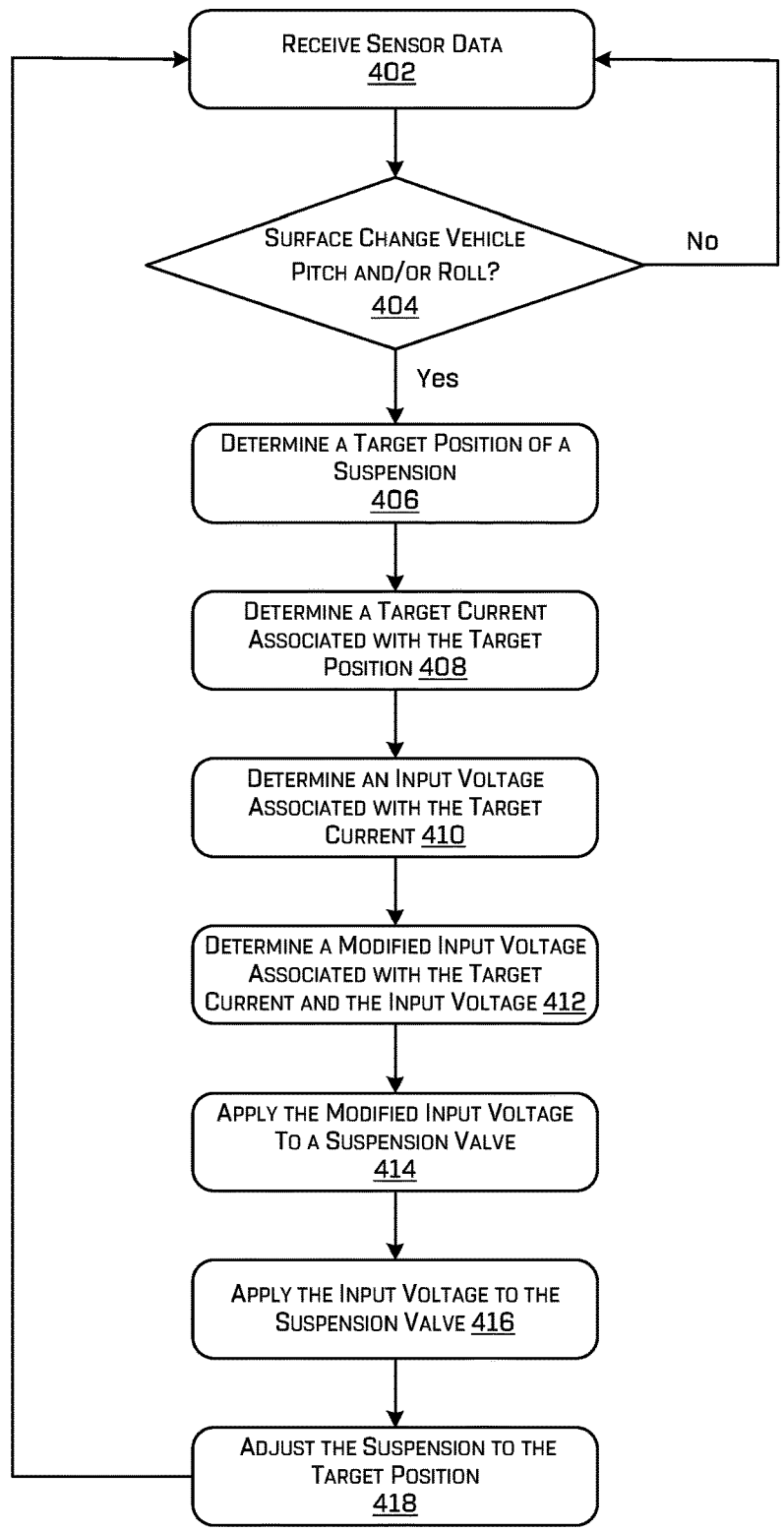
FIG. 4 is an example process for operating the active suspension system.
Figure 5:
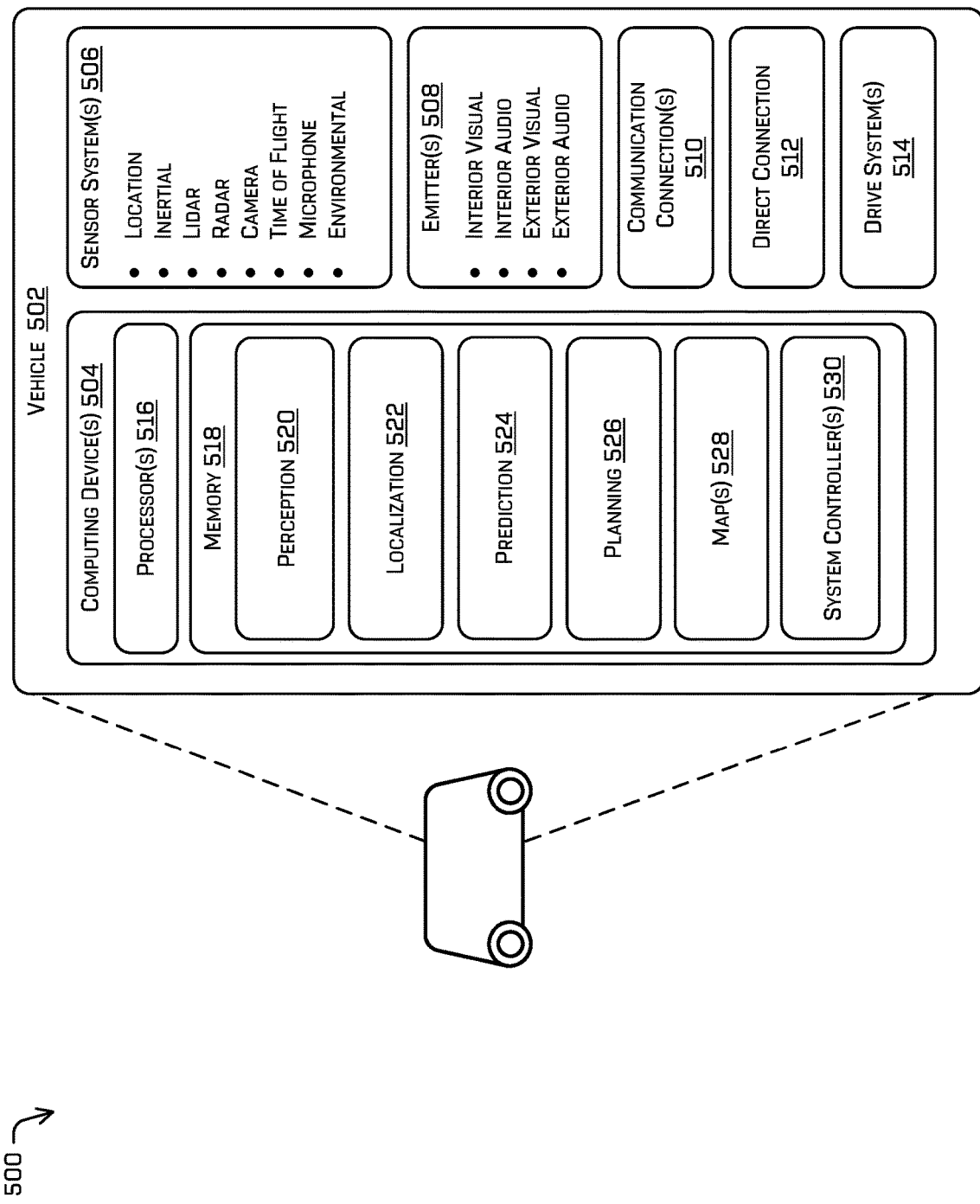
FIG. 5 depicts a block diagram of an example system that includes the active suspension system.

FIG. 4 illustrates an example process 400 for operating an active suspension system. In some examples, some or all of the process 400 may be performed by one or more components as illustrated in FIGS. 1 and 5, as described herein. In some examples, some or all of the process 400 may be performed or executed by one or more processors associated with a vehicle controller and by a suspension system. In some examples, some or all of the process 400 may be stored as computer-readable instructions that is stored within a non-transitory computer readable media (e.g. a memory associated with the thermal shock test system) and executable by the one or more processors.

At operation 402, the process may include receiving sensor data. In some examples, the sensor data may be generated by one or more sensors of a vehicle. In some examples, the sensor data may indicate an uneven surface in the trajectory of the vehicle. Additional details with respect to the operation 402 is described in association with FIGS. 1-3, as well as throughout this disclosure.

At operation 404, the process may include determining whether the uneven surface would change a pitch and/or roll of the vehicle. In some examples, determining whether the uneven surface would change the pitch and/or roll may include determining or receiving a pitch and/or roll of the vehicle while the vehicle is traveling across a flat surface and determining whether the vehicle would deviate from the pitch and/or roll associated with the flat surface when traveling across the uneven surface. In some examples, determining whether the vehicle would deviate from the pitch and/or roll associated with the flat surface may be based on a threshold pitch and/or roll such that if the pitch and/or roll associated with the uneven surface is determined to be less than or equal to the threshold pitch and/or roll then the vehicle controller can determine that the uneven surface does not change the pitch and/or roll of the vehicle. Additional details with respect to the operation 404 is described in association with FIGS. 1-3, as well as throughout this disclosure. If the vehicle controller determines that the uneven surface does not change the pitch and/or roll of the vehicle then the process reverts to the operation 402. If the vehicle controller determines that the uneven surface does change the pitch and/or roll of the vehicle then the process continues to operation 406.

At the operation 406, the process may include determining a target position of a suspension system based on the uneven surface. In some examples, the suspension system may be associated with a wheel that interacts with the uneven surface. In some examples, the target position may be a target position of an active component of the suspension system such as a position of an actuator piston of a hydraulic actuator. In some examples, the actuator piston may be movable to various positions along a longitudinal axis of the hydraulic actuator. In some example, the hydraulic actuator may be connected with a first valve that when open permits fluid to pass into the hydraulic actuator and resulting in the actuator piston moving upwards toward a body of the vehicle, thereby shortening a height of the suspension system and may be connected with a second valve that when open permits fluid to pass out of the hydraulic actuator and resulting in the actuator piston moving downwards away from the body of the vehicle, thereby lengthening the height of the suspension system. In some examples, the actuator piston of the hydraulic actuator may be connected with a stem that connects the hydraulic actuator with passive components (e.g., a strut that includes a spring and a damper) of the suspension system. Additional details with respect to the operation 406 is described in association with FIGS. 1-3, as well as throughout this disclosure.

At operation 408, the process may include determining a target current associated with the target position. In some examples, the operation 408 may determine a difference between a current position of the actuator piston and the target position. In some examples, the first valve and the second valve may be proportional solenoid valves, where each valve includes a valve piston, a solenoid, and a valve spring. In some examples, when no electric current is generated at the first valve and/or the second valve, the first valve and/or the second valve is maintained at a closed position by the valve spring. In some examples, when an electric current is generated at the solenoid the first valve and/or the second valve, an electromagnetic force from the solenoid counteracts a force of the valve spring and opens the first valve and/or the second valve. In some examples, because the first valve and the second valve are proportional solenoid valves, an amount that the first valve and/or second valve opens to is proportional to the amount of the generated electric current. In some examples, the amount that the first valve and/or the second valve opens to may be based on the difference between the current position of the actuator piston and the target position. For example, if the difference is small, then amount of the first valve and/or the second valve to open is proportionally small and therefore, the target current would also be proportionally small. Additional details with respect to the operation 408 is described in association with FIGS. 1-3, as well as throughout this disclosure.

At operation 410, the process may include determining an input voltage associated with the target current. In some examples, the input voltage may be a voltage that, when applied to the solenoid of the first valve and/or the second valve, results in generating, at the solenoid, an electrical current that is the target current. In some examples, when the input voltage is applied to the solenoid, an electric current is generated at the solenoid at a logarithmic time until the electric current reaches the target current. Additional details with respect to the operation 410 is described in association with FIGS. 1-3, as well as throughout this disclosure.

At operation 412, the process may include determining a modified input voltage. In some examples, the modified input voltage is a modification of the input voltage based on the target current. In some examples, the modified input voltage may be based on an inductance and/or a resistance of the solenoid. In some examples, the modified input voltage may be a voltage that, when applied to the solenoid, generates the target current at the solenoid within a time period that is shorter than the logarithmic time. In some examples, the time period may be a threshold time period. Additional details with respect to the operation 412 is described in association with FIGS. 1-3, as well as throughout this disclosure.

At operation 414, the process may include applying the modified input voltage to a suspension valve (e.g., the first valve or the second valve). In some examples, the modified input voltage may be applied to the solenoid of the first valve or the second valve until the electrical current generated at the solenoid reaches the target current. In some examples, the modified input voltage may be applied to the solenoid for the time period. Additional details with respect to the operation 414 is described in association with FIGS. 1-3, as well as throughout this disclosure.

At operation 416, the process may include applying the input voltage to the suspension valve. In some examples, the applied voltage may be changed from the modified input voltage to the input voltage once the electrical current generated at the solenoid reaches the target current or after the time period. In some examples, the input voltage maintains the electrical current at the target current. Additional details with respect to the operation 416 is described in association with FIGS. 1-3, as well as throughout this disclosure.

At operation 418, the process may include adjusting the suspension to the target position. In some examples, the operation 418 includes moving the actuator piston to the target position by moving the fluid into or out of the actuator through opening and/or closing the first valve and/or the second valve. Additional details with respect to the operation 418 is described in association with FIGS. 1-3, as well as throughout this disclosure. In some examples, once the suspension is at the target position, the process may continue back to the operation 402. In some examples, as the vehicle traverses through an environment, the process 400 may be continuously performed by the vehicle controller to continuously adjust, in real time or substantially real time, the position of its suspension(s) based on the changes at the surface that the vehicle is traversing on.

FIG. 5 depicts a block diagram of an example system 500 that a thermal shock test using the techniques described herein may be performed on. In at least one example, the system 500 may include a vehicle 502. In the illustrated example system 500, the vehicle 502 is an autonomous vehicle; however, the vehicle 502 may be any other type of vehicle.

In some examples, the vehicle 502 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 may be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 may include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 may be configured to capture sensor data associated with an environment.

The one or more sensor system(s) 506 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 may include multiple instances of each of these or other types of sensors. For instance, the time-of-flight sensors may include individual time-of-flight sensors located at the corners, front, back, sides, and/or top of the vehicle 502. As another example, the camera sensors may include multiple cameras disposed at various locations about the exterior and/or interior of the vehicle 502. The one or more sensor system(s) 506 may provide input to the computing device 504.

The vehicle 502 may also include one or more emitter(s) 508 for emitting light and/or sound. The one or more emitter(s) 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), or the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 may also include one or more communication connection(s) 510 that enable communication between the vehicle 502 and one or more other local or remote computing device(s) (e.g., a remote teleoperation computing device) or remote services. For instance, the one or more communication connection(s) 510 may facilitate communication with other local computing device(s) on the vehicle 502 and/or the one or more drive system(s) 514. Also, the one or more communication connection(s) 510 may allow the vehicle 502 to communicate with other nearby computing device(s) (e.g., other nearby vehicles, traffic signals, etc.).

The one or more communications connection(s) 510 may include physical and/or logical interfaces for connecting the computing device 504 to another computing device or one or more external networks (e.g., the Internet). For example, the one or more communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 may include one or more drive system(s) 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor system(s) 506 to detect conditions of the drive system(s) 514 and/or the surroundings of the vehicle 502. By way of example and not limitation, the sensor system(s) 506 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) 506 on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). In some examples, the suspension system may correspond to the suspension system 118 as illustrated and described in association with FIG. 1 as well as other suspension systems described throughout this disclosure. In some examples, the operations of the suspension system is described in association with FIGS. 1-4, as well as through this disclosure. Additionally, the drive system(s) 514 may include a drive system controller which may receive and preprocess data from the sensor system(s) 506 and to control operation of the various vehicle systems. In some examples, the drive system controller may include one or more processor(s) and memory communicatively coupled with the one or more processor(s). The memory may store one or more components to perform various functionalities of the drive system(s) 514. Furthermore, the drive system(s) 514 also include one or more communication connection(s) that enable communication by the respective drive system with one or more other local or remote computing device(s).

The computing device 504 may include one or more processor(s) 516 and memory 518 communicatively coupled with the one or more processor(s) 516. In the illustrated example, the memory 518 of the computing device 504 stores a perception component 520, a localization component 522, a prediction component 524, a planning component 526, a maps component 528, and one or more system controller(s) 530. Though depicted as residing in the memory 518 for illustrative purposes, it is contemplated that the perception component 520, the localization component 522, the prediction component 524, the planning component 526, the maps component 528, and the one or more system controller(s) 530 may additionally, or alternatively, be accessible to the computing device 504 (e.g., stored in a different component of vehicle 502) and/or be accessible to the vehicle 502 (e.g., stored remotely).

The perception component 520 may include functionality to perform object detection, segmentation, and/or classification. In some examples, the perception component 520 may provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 520 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

Further, the perception component 520 may include functionality to store perception data generated by the perception component 520. In some instances, the perception component 520 may determine a track corresponding to an object that has been classified as an object type. For purposes of illustration only, the perception component 520, using sensor system(s) 506 may capture one or more images of an environment. The sensor system(s) 506 may capture images of an environment that includes an object, such as a pedestrian. The pedestrian may be at a first position at a time T and at a second position at time T+t (e.g., movement during a span of time t after time T). In other words, the pedestrian may move during this time span from the first position to the second position. Such movement may, for example, be logged as stored perception data associated with the object.

The stored perception data may, in some examples, include fused perception data captured by the vehicle. Fused perception data may include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data. The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The localization component 522 may include functionality to receive data from the sensor system(s) 506 and/or other components to determine a position of the vehicle 502. For example, the localization component 522 may include and/or request/receive a three-dimensional map of an environment and may continuously determine a location of the autonomous vehicle within the map. In some instances, the localization component 522 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, or the like to accurately determine a location of the autonomous vehicle. In some instances, the localization component 522 may provide data to various components of the vehicle 502 to determine an initial position of an autonomous vehicle for generating a trajectory, as discussed herein.

The prediction component 524 may generate one or more probability maps representing prediction probabilities of possible locations of one or more objects in an environment. For example, the prediction component 524 may generate one or more probability maps for vehicles, pedestrians, animals, or the like within a threshold distance from the vehicle 502. In some instances, the prediction component 524 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 526 may determine a path for the vehicle 502 to follow to traverse through an environment. For example, the planning component 526 may determine various routes and paths and various levels of detail. In some instances, the planning component 526 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 526 may generate an instruction for guiding the autonomous vehicle along at least a portion of the route from the first location to the second location. In at least one example, the planning component 526 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 526 may alternatively, or additionally, use data from the perception component 520 and/or the prediction component 524 to determine a path for the vehicle 502 to follow to traverse through an environment. For example, the planning component 526 may receive data from the perception component 520 and/or the prediction component 524 regarding objects associated with an environment. Using this data, the planning component 526 may determine a route to travel from a first location (e.g., a current location) to a second location (e.g., a target location) to avoid objects in an environment. In at least some examples, such a planning component 526 may determine there is no such collision free path and, in turn, provide a path which brings vehicle 502 to a safe stop avoiding all collisions and/or otherwise mitigating damage.

The memory 518 may further include one or more maps 528 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. A map may further include an object identifier, an object classification, a three-dimensional location, covariance data (e.g., represented in image data or a multi-resolution voxel space), or the like. In some instances, a map may include, but is not limited to: texture information (e.g., color information (e.g., RGB color information, Lab color information, HSV/HSL color information), or the like), intensity information (e.g., LIDAR information, RADAR information, or the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, or the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 528 may include at least one map (e.g., images and/or a mesh). In some examples, the vehicle 502 may be controlled based at least in part on the map(s) 528. That is, the map(s) 528 may be used in connection with the perception component 520 (and sub-components), the localization component 522 (and sub-components), the prediction component 524, and/or the planning component 526 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 may include one or more system controller(s) 530, which may be configured to control steering, propulsion, braking, safety, emitters, communication, and other systems of the vehicle 502. These system controller(s) 530 may communicate with and/or control corresponding systems of the drive system(s) 514 and/or other components of the vehicle 502, which may be configured to operate in accordance with a path provided from the planning component 526.

The processor(s) 516 of the computing device 504 may be any suitable processor capable of executing instructions to process data and perform operations as described herein. By way of example and not limitation, the processor(s) 516 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 518 may be a non-transitory computer-readable media. The memory 518 may store an operating system and one or more software applications, instructions, programs, and/or data to implement the methods described herein and the functions attributed to the various systems. In various implementations, the memory 518 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying Figures are merely examples that are related to the discussion herein In some instances, aspects of some or all of the components discussed herein may include any models, algorithms, and/or machine-learning algorithms. For example, in some instances, the components in the memory 518 may be implemented as a neural network.

In some examples, the neural network may train a machine learned model that may determine a condition of one or more vehicle components such as a condition of a tire. The neural network may receive a reference data set of images of tires labeled with new tire conditions and training data sets of images of tires labeled based on one or more tire conditions. The training data sets may include images of tires at different types of tire conditions and a different wear levels of each particular tire condition. In some examples, the label may be tread depth. The images may be indicative of different levels of wear of the tire such each with different level of tread depths that are indicative of gradual wear of the tire. In some examples, the label may be distance traveled by the tire. In some examples, the label may be other types of tire wear such as puncture, uneven wear, and/or mis-alignment of tire. In some examples, vehicle 502 may determine the condition of the tire based on the machine learned model. In some examples, the neural network may train machine learned models to determine wear levels of different conditions of other vehicle components (e.g., motor, brakes, suspensions, drivetrain, joints, sensors, and/or the like).

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, or the like.

Figure 6:
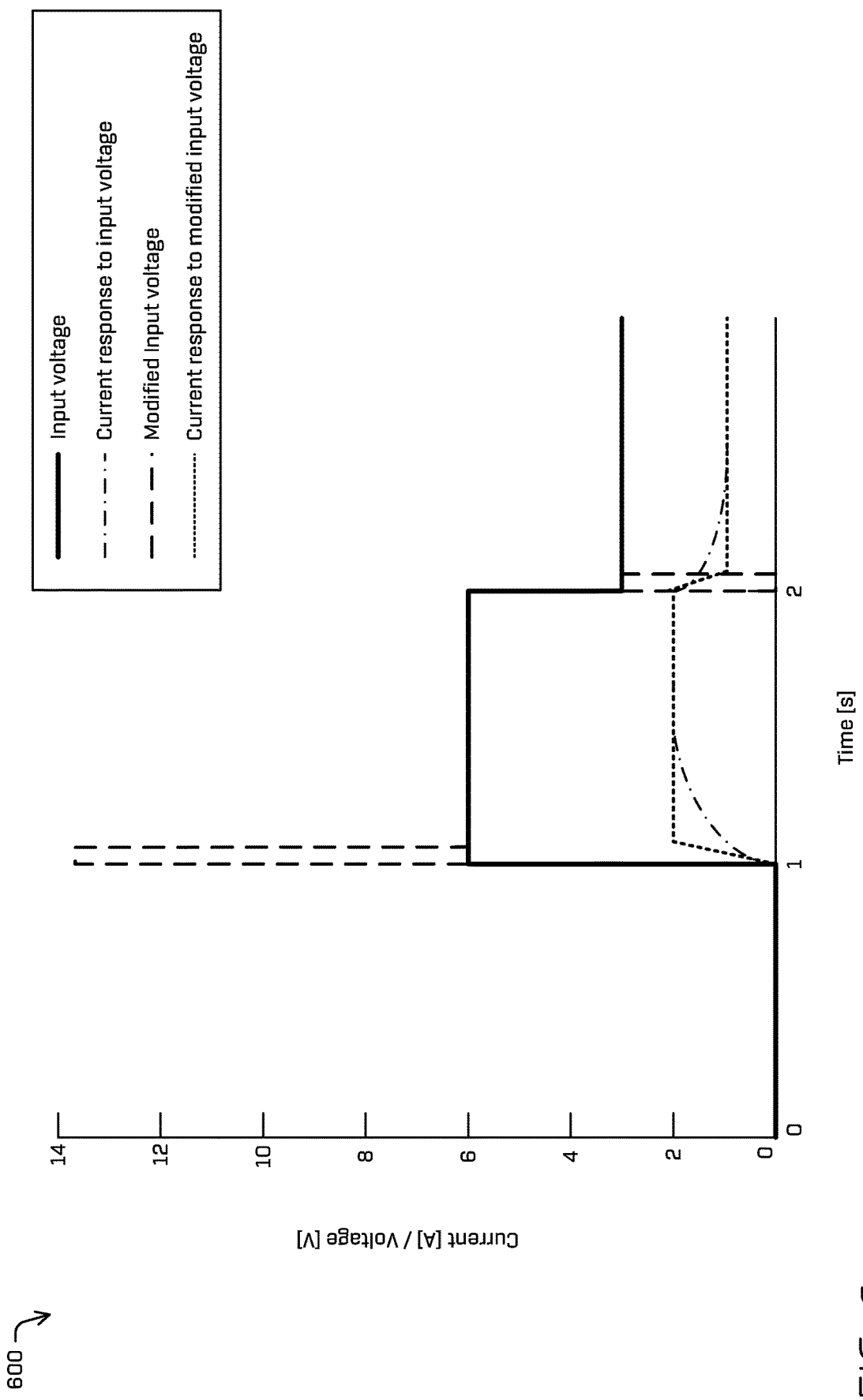
FIG. 6 depicts an example graph illustrating applying input voltage and applying modified input voltage to the suspension system.

FIG. 6 illustrates an example graph 600 of applying the input voltage and the modified input voltage to the suspension system. In some examples, applying the input voltage and the modified input voltage is described in association with FIG. 1 and FIG. 4, as well as throughout this disclosure. The example graph 600 illustrates a model for the input voltage, a model for the modified input voltage, a model for the current when the modified input voltage is applied, and a model for the current when only the input voltage is applied (also referred to as the reference current model). The example graph 600 illustrates a scenario where the target current between time (1) and time (2) is determined to be 2 A and between time (2) and time (3) is determined to be 1.5 A. The input voltage is determined to be 6 V at time (1) and 3 V at time (2). The modified input voltage is also illustrated based on the target current. The example graph 600 also illustrates that the current response based on the input voltage is much slower than the current response based on the modified input voltage. The example graph 600 may be determined and plotted based on the following equations (1)-(4).

$$V_{mod(i+1)} = V_{input(i+1)} + \frac{V_{input(i+1)} - R * \text{current}(i)}{\text{alpha}} \quad (1)$$

$$\text{alpha} = 1 - \exp\left(-dt * \frac{R}{L}\right) \quad (2)$$

$$\text{current }(i+1) = \text{alpha} * \frac{V_{mod(i+1)}}{R} + (1 - \text{alpha}) * \text{current }(i) \quad (3)$$

$$\text{current}_{ref(i+1)} = \text{alpha} * \frac{V_{input(i+1)}}{R} + (1 - \text{alpha}) * \text{current\_ref}(i) \quad (4)$$

In equations (1)-(4), the $V_{input}$ is the input voltage, the $V_{mod}$ is the modified input voltage, the current is the current based at least on the modified input voltage, the $\text{current}_{ref}$ is the current based only on the input voltage, R is the resistance associated with the solenoid, L is the inductance associated with the solenoid, i+1 is the current time step, and i is the previous time step.

FIGS. 1 and 4 illustrate example processes in accordance with examples of the disclosure. These processes are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, or the like that perform particular functions or implement particular abstract data types. The order in which the operations are described is not intended to be construed as a limitation, and any number of the described operations may be omitted or combined in any order and/or in parallel to implement the processes.

Example Clauses

A: An autonomous vehicle comprising: a sensor configured to generate sensor data as the autonomous vehicle traverses an environment; a suspension system comprising an actuator configured to adjust a height relative to a wheel; one or more processors; and one or more non-transitory computer-readable media storing instructions that, when executed by the one or more processors, causes the one or more processors to perform operations comprising: determining, based at least in part on the sensor data, a presence of an uneven surface along a trajectory of a first wheel of the autonomous vehicle; determining, based at least in part on the presence of the uneven surface, a target height associated with the actuator, the target height being above a current position associated with the actuator; determining a difference between the target height and the current position; determining a target current for application to the suspension system to move the actuator from the current position to the target height; determining an input voltage associated with the target current; determining, based at least in part on the input voltage and an inductance associated with a suspension component associated with the actuator, a modified input voltage different from the input voltage; determining a time associated with the wheel contacting the uneven surface; applying, based at least in part on the time associated with the wheel contacting the uneven surface, the modified input voltage to the suspension component to cause the actuator to move from the current position to the target height before or when the wheel contacts the uneven surface.

B: The autonomous vehicle of paragraph A, wherein the suspension system further comprises: a first valve fluidically coupled to the actuator and configured to permit or prevent a fluid to enter the actuator; and a second valve fluidically coupled to the actuator and configured to permit or prevent the fluid to exit the actuator; and wherein applying the modified input voltage comprises applying, based at least in part on the difference between the target height and the current position, the modified input voltage to the first valve to open the first valve.

C: The autonomous vehicle of paragraph B, wherein the first valve comprises a solenoid; and wherein applying the modified input voltage to the first valve comprises applying the modified input voltage to the solenoid.

D: The autonomous vehicle of any of paragraphs A-C, wherein the sensor data further comprises a distance between the autonomous vehicle and the uneven surface, the operations further comprising: determining, based at least in part on the distance between the autonomous vehicle and the uneven surface, a first period of time for arriving at the uneven surface; determining a second period of time associated with an electrical current reaching the target current based on applying the input voltage to the suspension component; and determining, based at least in part on the second period of time being greater than the first period of time, the modified input voltage such that the modified input voltage causes the electrical current to reach the target current within the first period of time.

E: The autonomous vehicle of any of paragraphs A-D, wherein the uneven surface is a first uneven surface, the actuator is a first actuator coupled to a first wheel of the autonomous vehicle; and wherein the suspension system further comprises a second actuator coupled to a second wheel of the autonomous vehicle, the operations further comprises: determine, based at least in part on second sensor data, a presence of a second uneven surface downstream from the first uneven surface and along a trajectory of the second wheel; determining, while the autonomous vehicle is between the first uneven surface and the second uneven surface, a second current position associated with the second actuator; determining, based at least in part on the presence of the second uneven surface, a second target height associated with the second actuator, the second target height being lower than the second current position; determining a second difference between the second current position and the second target height; determining a second target current for application to the suspension system to move the actuator from the second current position to the second target height; determining a second input voltage associated with the second target current; determining, based at least in part on the second input voltage and an inductance or a resistance associated with a second component associated with the actuator, a second modified input voltage different from the second input voltage; applying the second modified input voltage to the suspension component to cause the actuator to move from the current position to the target height.

F: A vehicle comprising: a suspension system comprising: an electrically controlled actuator associated with a wheel of the vehicle and configured to adjust a height associated with the suspension system proximate the wheel; one or more processors; and one or more non-transitory computer-readable media storing instructions that, when executed by the one or more processors, causes the one or more processors to perform operations comprising: determining a current position associated with the actuator; determining, based at least in part on an attribute associated with a travel path of the vehicle, a target position associated with the actuator, the target position having a different elevation than the current position; determining, based at least in part on a difference between the target position and the current position, a target current for application to a suspension component associated with the actuator; determining, based at least in part on the target current, an input voltage; determining, based at least in part on an inductance or resistance associated with the suspension component and the input voltage, a modified input voltage; and applying the modified input voltage to the suspension component.

G: The vehicle of paragraph F, wherein the actuator comprises a piston configured to move along a longitudinal axis of the actuator; and wherein the current position is a current position of the piston and the target position is a target position of the piston.

H: The vehicle of paragraph F or G, wherein the suspension component is a valve, the valve comprising a solenoid; and wherein applying the modified input voltage comprises applying the modified input voltage to the solenoid to cause the valve to open.

I: The vehicle of any of paragraphs F-H, wherein the inductance or the resistance associated with the suspension component is determined at a first time, the operations further comprising: determining, at a second time after the first time, an updated inductance or resistance associated with the suspension component; determining, based at least in part on the updated inductance or resistance, updated input voltage associated with the target current and updated modified input voltage associated with the target current; and applying the updated input voltage or the updated modified input voltage to the suspension component J: The vehicle of paragraph H, wherein applying the modified input voltage to the valve causes a current to generate at the valve, the operations further comprising; determining, while the modified input voltage is being applied to the valve, that the current has reached the target current; and applying the input voltage after the current has reached the target current.

K: The vehicle of any of paragraphs H-J, the operations further comprising: determining that the actuator has reached the target position; causing, based at least in part on the actuator reaching the target position, the valve to close.

L: The vehicle of any of paragraphs F-K, wherein the attribute associated with the travel path indicates a distance between the vehicle and an uneven surface; and wherein determining the modified input voltage comprises: determining a first period of time associated with a current reaching the target current based on the input voltage; determining a second period of time associated with the distance between the vehicle and the uneven surface, the second period of time being less than the first period of time; determining, based at least in part on the second period of time being less than the first period of time, the modified input voltage such that the current reaches the target current within the second period of time.

M: A vehicle of any of paragraphs F-L, wherein the attribute associated with the travel path comprises at least one of: sensor data associated with the travel path; map data; an acceleration associated with the vehicle; a braking associated with the vehicle; or a turn associated with the vehicle.

N: The vehicle of any of paragraphs F-M, the operations further comprising causing, based at least in part on applying the modified input voltage to the suspension component, the actuator to move from the current position to the target position.

O: The vehicle of any of paragraphs F-N, wherein the attribute associated with the travel path is indicative of an uneven surface, the operations further comprising: determining a time associated with the wheel contacting the uneven surface; applying, based at least in part on the time associated with the wheel contacting the uneven surface, the modified input voltage to the suspension component to cause the actuator to move from the current position to the target position before the wheel contacts the uneven surface.

P: A vehicle controller comprising: one or more processors; and one or more non-transitory computer-readable media storing instructions that, when executed by the one or more processors, causes the one or more processors to perform operations comprising: determining a current position associated with an electrically controlled actuator associated with a wheel of the vehicle; determining, based at least in part on an attribute associated with a travel path of a vehicle, a target position associated with the actuator, the target position having a different elevation than the current position; determining, based at least in part on a difference between the target position and the current position, a target current for application to a suspension component associated with the actuator; determining, based at least in part on the target current, an input voltage; determining, based at least in part on an inductance or resistance associated with a suspension component and the input voltage, a modified input voltage; and applying the modified input voltage to the suspension component.

Q: The vehicle controller of paragraph P, the operations further comprising causing, based at least in part on applying the modified input voltage to the suspension component, the actuator to move from the current position to the target position.

R: The vehicle controller of paragraph P or Q, wherein the suspension component is a valve, the valve comprising a solenoid; and wherein applying the modified input voltage comprises applying the modified input voltage to the solenoid to cause the valve to open.

S: The vehicle controller of paragraph R, wherein applying the modified input voltage to the valve causes a current to generate at the valve, the operations further comprising; determining, while the modified input voltage is being applied to the valve, that the current has reached the target current; and applying the input voltage after the current has reached the target current.

T: The vehicle controller of any of paragraphs P-S, wherein the attribute associated with the travel path is indicative of an uneven surface, the operations further comprising: determining a time associated with the wheel contacting the uneven surface; applying, based at least in part on the time associated with the wheel contacting the uneven surface, the modified input voltage to the suspension component to cause the actuator to move from the current position to the target position before the wheel contacts the uneven surface.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
a sensor configured to generate sensor data as the autonomous vehicle traverses an environment;
a suspension system comprising an actuator configured to adjust a height relative to a wheel;
one or more processors; and
one or more non-transitory computer-readable media storing instructions that, when executed by the one or more processors, causes the one or more processors to perform operations comprising:
determining, based at least in part on the sensor data, a presence of an uneven surface along a trajectory of a first wheel of the autonomous vehicle;
determining, based at least in part on the presence of the uneven surface, a target height associated with the actuator, the target height being above a current position associated with the actuator;
determining a difference between the target height and the current position;
determining a target current for application to the suspension system to move the actuator from the current position to the target height;
determining an input voltage associated with the target current;
determining, based at least in part on the input voltage and an inductance associated with a suspension component associated with the actuator, a modified input voltage different from the input voltage;
determining a time associated with the wheel contacting the uneven surface;
applying, based at least in part on the time associated with the wheel contacting the uneven surface, the modified input voltage to the suspension component to cause the actuator to move from the current position to the target height before or when the wheel contacts the uneven surface.

2. The autonomous vehicle of claim 1, wherein the suspension system further comprises:
a first valve fluidically coupled to the actuator and configured to permit or prevent a fluid to enter the actuator; and
a second valve fluidically coupled to the actuator and configured to permit or prevent the fluid to exit the actuator; and
wherein applying the modified input voltage comprises applying, based at least in part on the difference between the target height and the current position, the modified input voltage to the first valve to open the first valve.

3. The autonomous vehicle of claim 2, wherein the first valve comprises a solenoid; and
wherein applying the modified input voltage to the first valve comprises applying the modified input voltage to the solenoid.

4. The autonomous vehicle of claim 1, wherein the sensor data further comprises a distance between the autonomous vehicle and the uneven surface, the operations further comprising:
determining, based at least in part on the distance between the autonomous vehicle and the uneven surface, a first period of time for arriving at the uneven surface;
determining a second period of time associated with an electrical current reaching the target current based on applying the input voltage to the suspension component; and
determining, based at least in part on the second period of time being greater than the first period of time, the modified input voltage such that the modified input voltage causes the electrical current to reach the target current within the first period of time.

5. The autonomous vehicle of claim 1, wherein the uneven surface is a first uneven surface, the actuator is a first actuator coupled to a first wheel of the autonomous vehicle; and
wherein the suspension system further comprises a second actuator coupled to a second wheel of the autonomous vehicle, the operations further comprises:
determine, based at least in part on second sensor data, a presence of a second uneven surface downstream from the first uneven surface and along a trajectory of the second wheel;
determining, while the autonomous vehicle is between the first uneven surface and the second uneven surface, a second current position associated with the second actuator;
determining, based at least in part on the presence of the second uneven surface, a second target height associated with the second actuator, the second target height being lower than the second current position;
determining a second difference between the second current position and the second target height;
determining a second target current for application to the suspension system to move the actuator from the second current position to the second target height;
determining a second input voltage associated with the second target current;
determining, based at least in part on the second input voltage and an inductance or a resistance associated with a second component associated with the actuator, a second modified input voltage different from the second input voltage;
applying the second modified input voltage to the suspension component to cause the actuator to move from the current position to the target height.

6. A vehicle comprising:
a suspension system comprising:
an electrically controlled actuator associated with a wheel of the vehicle and configured to adjust a height associated with the suspension system proximate the wheel;
one or more processors; and
one or more non-transitory computer-readable media storing instructions that, when executed by the one or more processors, causes the one or more processors to perform operations comprising:
determining a current position associated with the actuator;
determining, based at least in part on an attribute associated with a travel path of the vehicle, a target position associated with the actuator, the target position having a different elevation than the current position;
determining, based at least in part on a difference between the target position and the current position, a target current for application to a suspension component associated with the actuator;
determining, based at least in part on the target current, an input voltage;

determining, based at least in part on an inductance or resistance associated with the suspension component and the input voltage, a modified input voltage; and applying the modified input voltage to the suspension component.

7. The vehicle of claim 6, wherein the actuator comprises a piston configured to move along a longitudinal axis of the actuator; and wherein the current position is a current position of the piston and the target position is a target position of the piston.

8. The vehicle of claim 6, wherein the suspension component is a valve, the valve comprising a solenoid; and wherein applying the modified input voltage comprises applying the modified input voltage to the solenoid to cause the valve to open.

9. The vehicle of claim 8, wherein applying the modified input voltage to the valve causes a current to generate at the valve, the operations further comprising;

determining, while the modified input voltage is being applied to the valve, that the current has reached the target current; and applying the input voltage after the current has reached the target current.

10. The vehicle of claim 8, the operations further comprising:

determining that the actuator has reached the target position;

causing, based at least in part on the actuator reaching the target position, the valve to close.

11. The vehicle of claim 6, wherein the inductance or resistance associated with the suspension component is determined at a first time, the operations further comprising:

determining, at a second time after the first time, an updated inductance or resistance associated with the suspension component;

determining, based at least in part on the updated inductance or resistance, updated input voltage associated with the target current and updated modified input voltage associated with the target current; and applying the updated input voltage or the updated modified input voltage to the suspension component.

12. The vehicle of claim 6, wherein the attribute associated with the travel path indicates a distance between the vehicle and an uneven surface; and wherein determining the modified input voltage comprises:

determining a first period of time associated with a current reaching the target current based on the input voltage;

determining a second period of time associated with the distance between the vehicle and the uneven surface, the second period of time being less than the first period of time;

determining, based at least in part on the second period of time being less than the first period of time, the modified input voltage such that the current reaches the target current within the second period of time.

13. A vehicle of claim 6, wherein the attribute associated with the travel path comprises at least one of:

sensor data associated with the travel path;
map data;
an acceleration associated with the vehicle;
a braking associated with the vehicle; or
a turn associated with the vehicle.

14. The vehicle of claim 6, the operations further comprising causing, based at least in part on applying the modified input voltage to the suspension component, the actuator to move from the current position to the target position.

15. The vehicle of claim 6, wherein the attribute associated with the travel path is indicative of an uneven surface, the operations further comprising:

determining a time associated with the wheel contacting the uneven surface;

applying, based at least in part on the time associated with the wheel contacting the uneven surface, the modified input voltage to the suspension component to cause the actuator to move from the current position to the target position before the wheel contacts the uneven surface.

16. A vehicle controller comprising:

one or more processors; and one or more non-transitory computer-readable media storing instructions that, when executed by the one or more processors, causes the one or more processors to perform operations comprising:

determining a current position associated with an electrically controlled actuator associated with a wheel of the vehicle;

determining, based at least in part on an attribute associated with a travel path of a vehicle, a target position associated with the actuator, the target position having a different elevation than the current position;

determining, based at least in part on a difference between the target position and the current position, a target current for application to a suspension component associated with the actuator;

determining, based at least in part on the target current, an input voltage;

determining, based at least in part on an inductance or resistance associated with a suspension component and the input voltage, a modified input voltage; and applying the modified input voltage to the suspension component.

17. The vehicle controller of claim 16, the operations further comprising causing, based at least in part on applying the modified input voltage to the suspension component, the actuator to move from the current position to the target position.

18. The vehicle controller of claim 16, wherein the suspension component is a valve, the valve comprising a solenoid; and wherein applying the modified input voltage comprises applying the modified input voltage to the solenoid to cause the valve to open.

19. The vehicle controller of claim 18, wherein applying the modified input voltage to the valve causes a current to generate at the valve, the operations further comprising;

determining, while the modified input voltage is being applied to the valve, that the current has reached the target current; and applying the input voltage after the current has reached the target current.

20. The vehicle controller of claim 16, wherein the attribute associated with the travel path is indicative of an uneven surface, the operations further comprising:

determining a time associated with the wheel contacting the uneven surface;

applying, based at least in part on the time associated with the wheel contacting the uneven surface, the modified input voltage to the suspension component to cause the actuator to move from the current position to the target position before the wheel contacts the uneven surface.

* * * * *